Oct. 18, 1949.　　　　　E. LISOTA　　　　　2,485,300
ADJUSTABLE VEHICLE BED
Filed Jan. 30, 1948　　　　　　　　　　　2 Sheets-Sheet 1
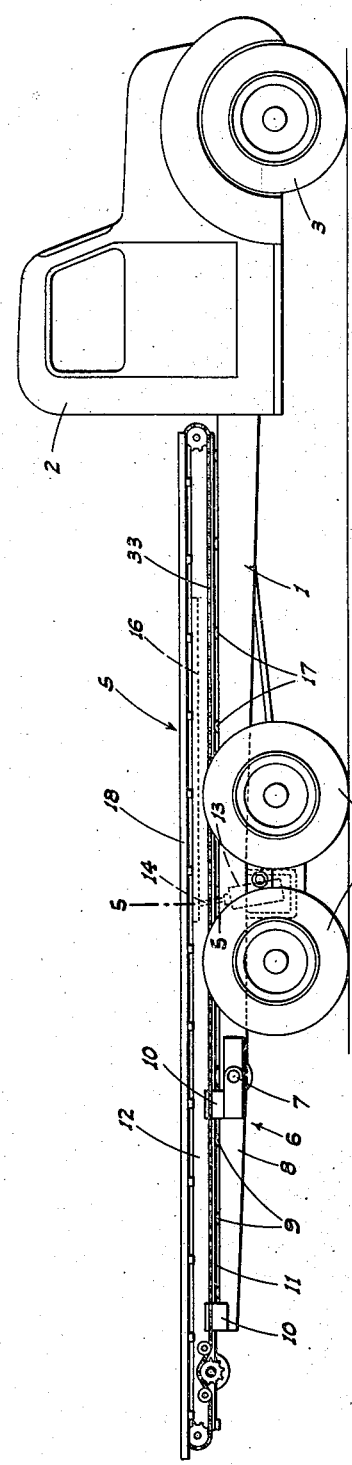
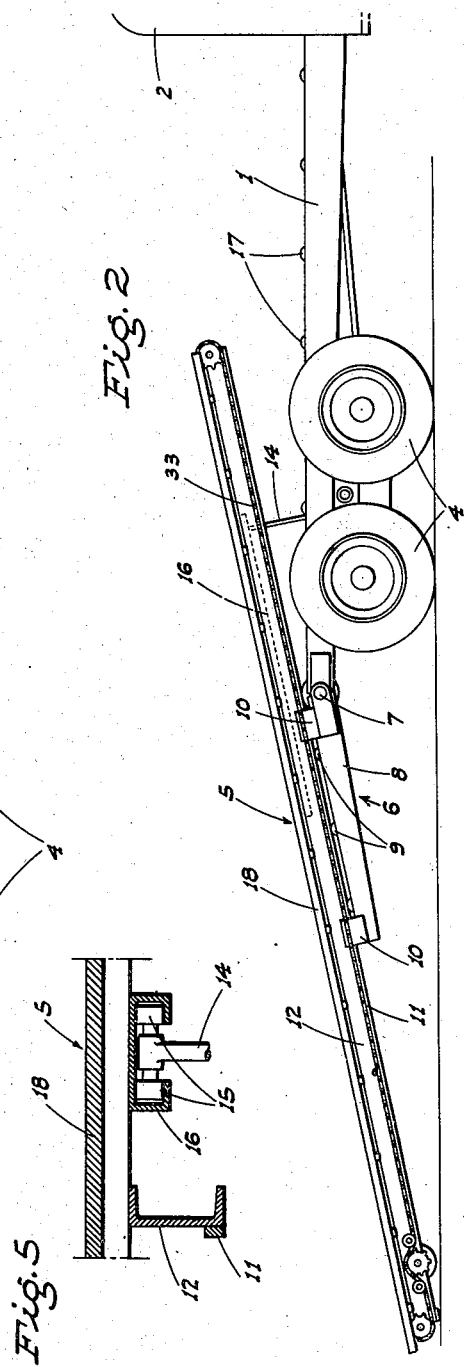
INVENTOR
Edward Lisota
BY
ATTORNEYS

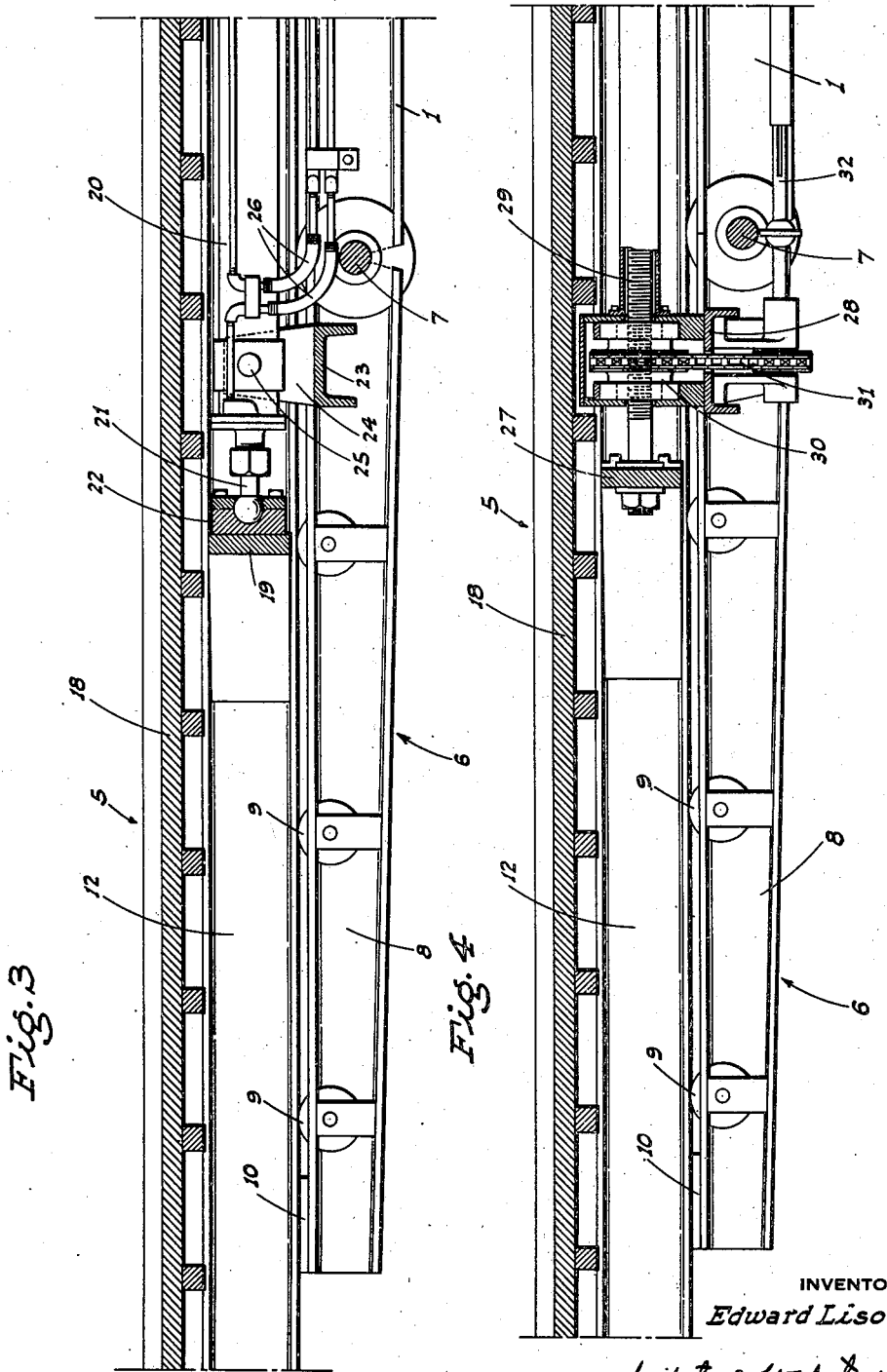

Patented Oct. 18, 1949

2,485,300

UNITED STATES PATENT OFFICE 2,485,300

ADJUSTABLE VEHICLE BED

Edward Lisota, Patterson, Calif.

Application January 30, 1948, Serial No. 5,331

4 Claims. (Cl. 214—85)

1

The present invention is directed to an adjustable bed vehicle, and in particular represents a modification of the structures embraced by copending U. S. Patent applications, Serial No. 742,351, filed April 18, 1947, now Pat. No. 2,466,452 granted April 5, 1949, and Serial No. 763,629, filed July 25, 1947, now Pat. No. 2,468,502 granted April 26, 1949.

The general concept of the invention is to provide a longitudinal, normally advanced and horizontal bed assembly mounted in connection with the main frame of a truck for rearward sliding motion, and downward tilting into ground engagement to facilitate loading or unloading operations. In the two above identified copending applications the tilting of the bed assembly is accomplished by articulating the truck frame ahead of the rear wheels, and mounting the sliding bed assembly on the rearmost section of said articulated frame.

It is an object of the present invention to accomplish the desired tilting of the slidable bed assembly by mounting the latter on an extension frame pivotally connected to, and projecting rearwardly from, the main frame of the truck to the rear of its back wheels.

Another object of the instant invention is to provide an adjustable vehicle bed which is designed so that it may be attached to a conventional truck without any major reconstruction of the frame thereof.

A further object of the invention is to provide a practical and convenient adjustable vehicle bed assembly, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of a truck having the adjustable vehicle bed mounted thereon; the bed being shown in its normal advanced and horizontal position.

Fig. 2 is a similar view, but shows the bed as slid rearwardly on the extension frame and inclined downwardly into ground engagement for loading or unloading operations.

Fig. 3 is an enlarged fragmentary sectional elevation showing one form of mechanism used to slide the bed.

Fig. 4 is a similar view, but shows another form of mechanism used to slide the bed.

Fig. 5 is a fragmentary cross section on line 5—5 of Fig. 1.

Referring now more particularly to the characters of reference on the drawings, the numeral 1 indicates the main frame of a truck, which truck includes a cab 2, front wheels 3, and rear wheels 4.

A longitudinal vehicle bed assembly, indicated generally at 5, is disposed lengthwise above the truck frame 1 and is normally disposed in an advanced horizontal position, as shown in Fig. 1; such bed assembly 5 being of a length such that it extends some distance back of the rear wheels 4 even when in normal advanced position of said bed assembly.

The truck frame is fitted, at its rear end, with a rearwardly projecting extension frame, indicated generally at 6, pivotally connected, at the front end, as at 7, to said truck frame for downward tilting from a normally horizontal position. The extension frame 6 is a rigid structure, and includes side beams 8; such side beams each being fitted with upwardly exposed rollers 9 on which the vehicle bed assembly 5 is adapted to slide lengthwise. Escape of the vehicle bed assembly 5 from the rollers 9 of the extension frame 6 is prevented by flanged hold-down fingers 10 on the side beams 8, which engage over longitudinal shoulders 11 on the side beams 12 of said vehicle bed assembly 5.

When in its normally advanced position, the bed assembly 5 tends to remain horizontal, i. e. against rearward tilting, for the reason that the center of weight is ahead of the pivot 7. However, when the vehicle bed assembly 5 is slid rearwardly, as in Fig. 2, the center of weight shifts to the rear of the pivot 7 and said bed assembly, and the extension frame 6 tilt downwardly until the rear end of the bed assembly strikes the ground.

Under certain working conditions it may be desirable that the longitudinal bed assembly 5 be power tilted or returned to horizontal, and in such event this is accomplished by a fluid pressure actuated power cylinder 13, preferably of double-acting type, pivotally mounted in the truck frame 1 and including an upwardly projecting piston rod 14. At its upper end the piston rod 14 includes a roller unit 15 which runs in non-separable relation in a longitudinal channel track 16 (see Fig. 5) suitably mounted in the truck frame 1. It will thus be seen that upon retraction of the piston rod 14, the longitudinal bed assembly 5 is pulled down to normal horizontal position where it is supported by transverse rolls 17 on the truck frame 1. Extension of the piston rod 14 pushes the bed assembly 5 upwardly ahead of the pivot 7 to accomplish the desired tilting. This power cylinder arrangement will be found in somewhat greater detail in the above identified copending application, Serial No. 742,351, and is intended to be controlled by a fluid pressure system (not shown) which includes a control valve in the cab 2.

The longitudinal bed assembly 5 is adapted to be shifted or slid lengthwise relative to the extension frame and between the normal position of Fig. 1 and the rearwardly slid, inclined position of Fig. 2, by means of power mechanism, one type of which is shown in Fig. 3, and another type of which is shown in Fig. 4.

In Fig. 3 the bed assembly 5 includes a floor 18 supported by the side beams 12. Below the floor and to the rear of the pivot 7, the bed assembly 5 is fitted with a cross beam 19. A fluid pressure actuated power cylinder 20, of double-acting type, extends longitudinally forward from the cross beam 19; the piston rod 21 of said cylinder being connected to said cross beam by a ball and socket unit 22.

A cross beam 23 connects the side beams 8 of the extension frame 6 also rearwardly of the pivot 7, and said cross beam includes brackets 24 to which the power cylinder 20 is pivoted, as at 25.

With the above arrangement the power cylinder 20, upon extension thereof, is operative to slide the longitudinal bed assembly 5 rearwardly on the extension frame 6, regardless of the angular position of the latter, i. e. whether it be horizontal or tilted. Contraction of the power cylinder 20 has the opposite effect, and advances said bed assembly 5 on the extension frame 6.

The power cylinder 20 is controlled by a fluid pressure system, indicated in part at 26, and which includes a control valve (not shown) in the cab 2.

The type of mechanism for sliding the longitudinal bed assembly 5, as shown in Fig. 4, comprises the following arrangement:

Cross beams 27 and 28 are connected between the side beams 12 and 8, respectively, of the bed assembly 5 and extension frame 6; the cross beam 27 and cross beam 28 being longitudinally spaced, and both to the rear of the pivot 7. A longitudinal screw 29 is fixed, at its rear end, to the cross beam 27, and thence extends forwardly through an axially fixed, rotary nut 30 journaled in a suitable carrier secured to the cross beam 28. The rotary nut 30 is adapted to be driven by a chain and sprocket unit 31 mounted in connection with the cross beam 28 and adapted to be driven by a universal drive shaft, shown in part at 32. Upon rotation of the drive shaft 32, and longitudinal screw 29 in one direction, said screw travels rearwardly to slide the bed assembly in a corresponding direction relative to the extension frame 6. On the other hand opposite rotation of said screw advances the bed assembly relative to said extension frame 6.

Operation of the universal drive shaft 32 is controlled by the operator from within the truck cab 2.

The bed assembly sliding mechanisms of Figs. 3 and 4 are illustrated in somewhat greater detail in the above identified applications, Serial Nos. 763,629 and 742,351, respectively.

The longitudinal bed assembly 5, as in the copending applications, includes a power actuating loading and unloading mechanism, indicated in part at 33.

With the above described adjustable vehicle bed, including the embodiment of the rearwardly projecting extension frame 6 as the slide mounting for the bed assembly 5, it is possible for the device to be mounted in connection with a conventional truck without the necessity of any major reconstruction of the main frame of the latter.

From the foregoing description it will be readily seen that there has been produced such a device as substantially fulfills the objects of the invention as set forth herein.

While this specification sets forth in detail, the present and preferred construction of the device, still in practice such deviations from such detail may be resorted to as do not form a departure from the spirit of the invention, as defined by the appended claims.

Having thus described the invention, the following is claimed as new and useful and upon which Letters Patent are desired:

1. A vehicle comprising a wheel-supported main frame, a bed assembly extending lengthwise of the main frame, an extension frame projecting rearwardly from the rear end of the main frame, a transverse axis hinge between adjacent ends of said frames, means mounting the bed assembly on the extension frame for longitudinal sliding motion and for tilting therewith, and means operative to effect such sliding motion of the bed assembly; said last named means including a power actuated screw unit coupled between the extension frame and bed assembly.

2. A vehicle comprising a wheel-supported main frame, a bed assembly extending lengthwise of the main frame, an extension frame projecting rearwardly from the rear end of the main frame, a transverse axis hinge between adjacent ends of said frames, means mounting the bed assembly on the extension frame for longitudinal sliding motion and for tilting therewith, and means operative to effect such sliding motion of the bed assembly; said last named means including a fluid pressure actuated power cylinder unit coupled between the extension frame and bed assembly.

3. A vehicle comprising a wheel-supported main frame, a bed assembly extending lengthwise of the main frame, an extension frame projecting rearwardly from the rear end of the main frame, a transverse axis hinge between adjacent ends of said frames, means mounting the bed assembly on the extension frame for longitudinal sliding motion and for tilting therewith, and means operative to effect such tilting motion of the bed assembly; said last named means including a power cylinder on the main frame, a piston rod projecting to the bed assembly, a roller unit on the piston rod, and a longitudinal channel track on the bed assembly in which the roller unit non-separably engages.

4. A vehicle comprising a wheel supported main frame, such main frame comprising a front section and a rear section, adjacent ends of the sections abutting at a point to the rear of the rear wheels of the vehicle and being pivoted together at said point about a transverse axis whereby the rear section may tilt downwardly toward the ground, the top surfaces of the sections normally lying in the same horizontal plane, a bed assembly slidably mounted on the rear section and such assembly normally resting on the frame sections in overlapping relation thereto with the preponderance of the weight thereof on the front section whereby to maintain the rear section in its normally horizontal plane, and means to slide the bed assembly rearward whereby to throw the preponderance of weight on the rear section and cause it to tilt downwardly.

EDWARD LISOTA.

REFERENCES CITED

The following references are of record in the file of this patent:

UNITED STATES PATENTS

| Number | Name | Date |
|---|---|---|
| 1,442,769 | Jackson et al. | Jan. 16, 1923 |
| 1,747,162 | Davis | Feb. 18, 1930 |
| 2,065,833 | Stratton et al. | Dec. 29, 1936 |
| 2,082,663 | Slater | June 1, 1937 |